July 1, 1930. J. PARKER 1,769,601
MULTIPLE DISK FOR SOIL PULVERIZERS
Filed May 9, 1927
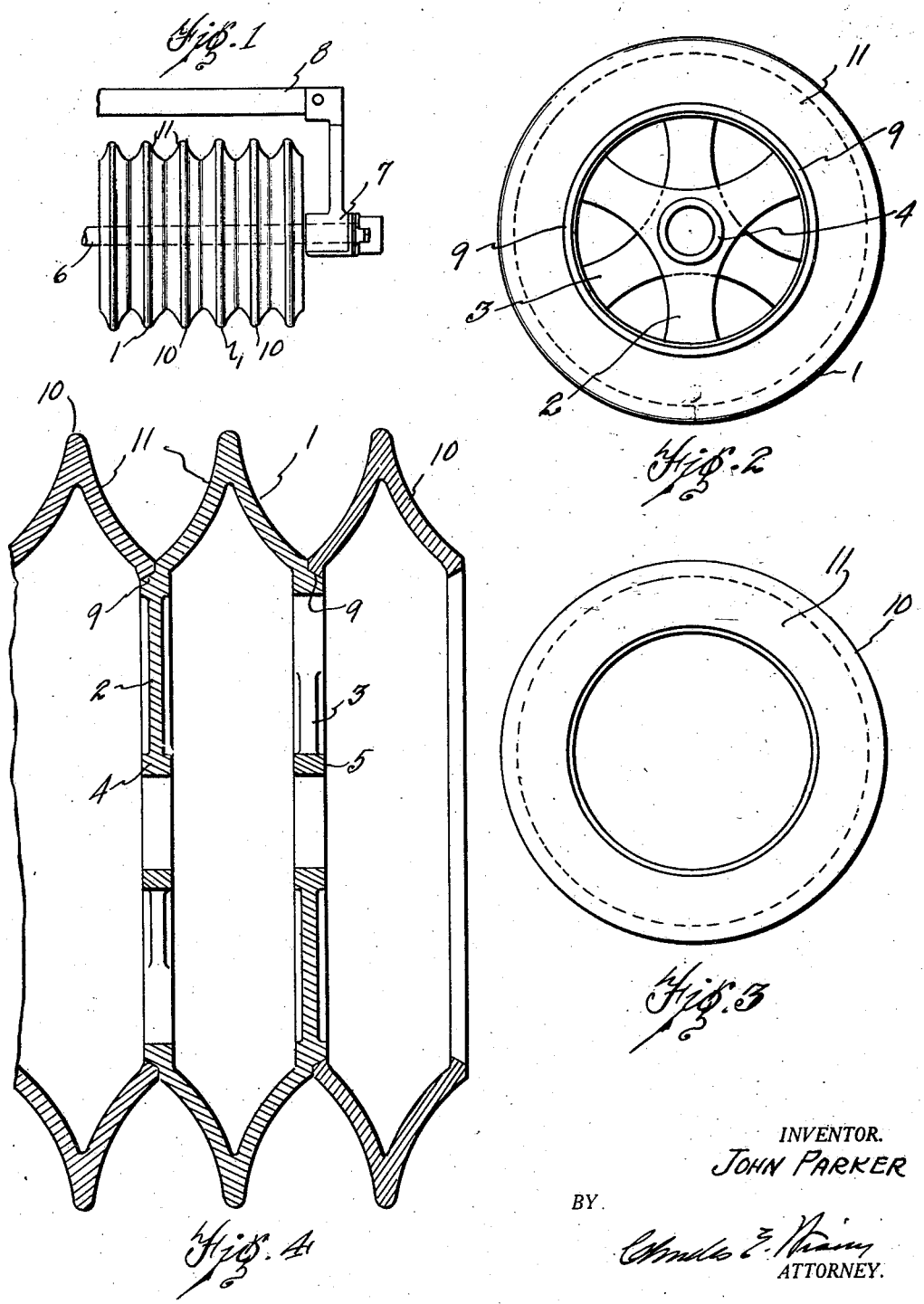
INVENTOR.
JOHN PARKER
BY
ATTORNEY.

Patented July 1, 1930

1,769,601

UNITED STATES PATENT OFFICE

JOHN PARKER, OF RICHMOND, MICHIGAN

MULTIPLE DISK FOR SOIL PULVERIZERS

Application filed May 9, 1927. Serial No. 189,906.

This invention relates to soil pulverizers and the object of the invention is to provide a multiple disk for soil pulverizers in which every other disk is supported to rotate on a shaft while the intermediate disks are supported on the adjacent disks.

In the ordinary soil pulverizer of the disk type each disk is supported on the shaft and due to the space required for the hubs of the disks the disks are made so that the peripheral edges thereof are considerable distance apart and for this reason a second row of disks is usually mounted on a shaft behind the first row and in staggered relation therewith in order to break up the lumps of earth not crushed by the first set of disks. With a pulverizer of this type a hard lump which passes the first set of disks will usually be forced to one side by one of the second set of disks so as to pass between two adjacent disks of the second row.

The object of my invention is to provide an arrangement whereby the disks may be mounted sufficiently close together in a single row as to crush any lumps of earth that will ordinarily pass the usual type of soil pulverizer as hereinbefore described.

These objects and the several novel features of the invention are hereinafter more fully described and claimed and the preferred form of construction by which these objects are attained is shown in the accompanying drawings in which—

Fig. 1 is an elevation of one end of a soil pulverizer embodying my invention.

Fig. 2 is a side elevation of one type of disk used in the pulverizer.

Fig. 3 is a similar view of the other type of disk used in the soil pulverizer.

Fig. 4 is a section through several of the disks in assembled relation.

As shown in Fig. 4 the pulverizing disks are cast in one piece and the disk 1 shown in Figs. 2 and 4 is provided with spiders 2 and 3 on opposite sides thereof which support the annular hubs 4 and 5. These hubs are apertured to receive the shaft 6 which is journaled in bearings 7 secured to the frame 8 of the soil pulverizer. The disk 1 is provided on each side with an annular sloping shoulder 9 and the disks 1 are separated by disks 10 so that every other disk is a disk 1 having hubs for the shaft 6 while the intermediate disks 10 are provided with flanges adapted to seat on the shoulders 9 of the adjacent disks 1. With this arrangement the disks 10 rotate about the shaft 6 with the disks 1 as the soil pulverizer is drawn over the ground. The disks having the hubs on opposite sides thereof have the shoulders 9 formed in the side portions practically in the same plane as the hub members 5 and thus the second series of disks 10 which are of ring like form seat on these shoulders and are supported by the hub portions of the other disk. This provides a construction of great strength as the shoulders of the first member are supported by the integral side portions in which the hubs are formed. This construction also allows the disks to be positioned closer together than the ordinary construction and thus the lumps of earth are broken up into smaller pieces by use of this construction. The curved outer faces 11 of the disks are shaped to prevent the soil from packing between the disks and by mounting the disks 10 on the disks 1 the disks may all roll together as the soil pulverizer is drawn over the ground or the individual disks may rotate in relation to each other.

From the foregoing description it becomes evident that a simple construction is provided by which the disks may be mounted more closely together and by this construction the manufacturing cost is reduced and at the same time a device is provided which accomplishes the objects described.

Having thus fully described my invention, its utility and mode of operation, what I claim and desire to secure by Letters Patent of the United States is—

1. A multiple disk for soil pulverizers comprising the combination with a shaft, of a disk formed with integral hub portions on opposite sides thereof to receive the shaft and an external recess providing an annular shoulder on each of said sides practically in the same plane as and supported by the said hub portions, a second disk member of ring like form provided with side portions setting in and rotatably supported on the shoulders of adjacent recess of the first form on opposite sides thereof.

2. A multiple disk for soil pulverizers comprising a shaft, a series of disks each provided with a hub apertured to receive the shaft, said disks having an external annular shoulder on opposite sides and spokes extending from the shoulders to the hub, a second series of disks of integral form positioned between the disks of the first series and provided with annular flanges seating on and supported by the annular shoulders of the first series of disks.

3. A multiple disk for soil pulverizers comprising a shaft, a series of disks each having external annular shoulders on opposite sides, a hub and spokes formed integrally with the shoulders to provide a sustaining means therefor, a second series of disks of ring like form positioned between disks of the first series and rotatably mounted on and supported by the annular shoulders thereof.

In testimony whereof I sign this specification.

JOHN PARKER.